US012440869B2

(12) United States Patent
Vaughn

(10) Patent No.: US 12,440,869 B2
(45) Date of Patent: Oct. 14, 2025

(54) SCREENING BUCKET FOR WOOD COOKING PELLETS

(71) Applicant: Georgia Torrefaction Technology LLC, Evans, GA (US)

(72) Inventor: Mark Keith Vaughn, Evans, GA (US)

(73) Assignee: Georgia Torrefaction Technology LLC, Evans, GA (US)

( * ) Notice: Subject to any disclaimer, the term of this patent is extended or adjusted under 35 U.S.C. 154(b) by 0 days.

(21) Appl. No.: 18/886,479

(22) Filed: Sep. 16, 2024

(65) Prior Publication Data

US 2025/0100016 A1 Mar. 27, 2025

Related U.S. Application Data

(60) Provisional application No. 63/584,203, filed on Sep. 21, 2023.

(51) Int. Cl.
*B07B 1/02* (2006.01)
*F24B 13/04* (2006.01)

(52) U.S. Cl.
CPC ................ *B07B 1/02* (2013.01); *F24B 13/04* (2013.01)

(58) Field of Classification Search
CPC .... B07B 1/02; B07B 1/04; B07B 1/46; B07B 13/16; F24B 13/04
See application file for complete search history.

(56) References Cited

U.S. PATENT DOCUMENTS

2020/0147645 A1 * 5/2020 Goosen ..................... B07B 1/06

* cited by examiner

*Primary Examiner* — Jacob S. Scott
*Assistant Examiner* — Miraj T. Patel
(74) *Attorney, Agent, or Firm* — Mehrman Law Office; Michael J. Mehrman

(57) ABSTRACT

A screening bucket for wood cooking pellets with a spring-loaded sifting screen to facilitate the separation of wood dust from the cooking pellets stored in the bucket. The user pours a supply of wood pellets into the bucket, and the dispenses the pellets from the screening bucket into the grill or stove as needed. The wood pellets are dispensed through a pellet port in the lid of the bucket, while the dust is discharged through a dust port in the bottom of the bucket. A spring-loaded sifting screen captured on a retainer pin near the bottom pf the bucket allows to use to shake and tap the bucket to facilitate separation of the dust from the pellets.

19 Claims, 5 Drawing Sheets

SCREENING BUCKET FOR WOOD COOKING PELLETS

REFERENCE TO RELATED APPLICATIONS

This application claims priority to U.S. Provisional Patent Application Ser. No. 63/584,203 filed Sep. 21, 2023, which is incorporated by reference.

TECHNICAL FIELD

The present invention relates to wood cooking pellets and, more particularly, to a screening bucket for wood cooking pellets with a spring-loaded sifting screen to facilitate separation of wood dust from the cooking pellets stored in the bucket.

BACKGROUND

Wood cooking pellets are a popular choice for barbeque grills and wood-burning stoves. The wood pellets, which are typically sold in 10- to 50-pound bags, tend to shed a significant amount of wood dust as they are handled. The wood dust burns much more quickly than the wood pellets, which can cause dangerous flaring when the user pours the pellets from the bag into a burning grill or stove. The wood dust can also clog the fire, put out a lot of smoke, and generally make a mess. Separating the wood dust from the pellets can be difficult, particularly as the user gets to the bottom of the bag. There is, therefore, a need for an effective solution for separating the dust from wood cooking pellets.

SUMMARY

The needs described above are met by a screening bucket for wood cooking pellets with a spring-loaded sifting screen to facilitate separation of wood dust from the cooking pellets stored in the bucket. The user pours a supply of wood pellets into the bucket, and then dispenses the pellets from the screening bucket into the grill or stove as needed. The wood pellets are dispensed through a pellet port in the lid of the bucket, while the wood dust is discharged through a dust port in the bottom of the bucket. A spring-loaded sifting screen captured on a retainer pin near the bottom of the bucket allows the user to shake and tap the bucket to facilitate separation of the dust from the pellets.

A representative embodiment includes a container defining a top, a bottom, and an interior. A lid removably attached to the top of the container includes a pellet port sized for dispensing wood pellets from the interior of the container through the lid. A sifting screen spaced apart from the bottom of the container divides the interior of the container into a pellet holding section and a dust collection section. The retainer pin captures the sifting screen to the bottom of the container while allowing the sifting screen to move along the retainer pin of the retainer. One or more shaker springs positioned between the sifting screen and the bottom of the container biases the sifting screen away from the bottom of the container. A dust port through the bottom of the container for discharging wood dust shed by wood pellets. The sifting screen has a mesh size causing wood pellets in the pellet holding section to remain above the sifting screen while allowing wood dust shed by the wood pellets to pass through the sifting screen into the dust collection section. Movement of the sifting screen along the retainer in response to jostling and tapping of the container facilitates movement of the wood dust from the pellet holding section into the dust collection section.

Various options include a handle retained by the container for lifting while tapping, jostling, tilting and tipping over the container, a removable fitting sized to selectively fit in the pellet port, and a removable plug sized to selectively fit in the dust port. The mesh size may be in the range of ⅛-inch to ¼-inch. A retainer, such as a hole through the bottom of the container, secure a head of the retainer pin to the bottom of the container. The retainer pin may also include a nut capturing the sifting screen on the retainer pin while allowing the sifting screen to move along the retainer pin away from the nut toward the bottom of the container.

Another option includes a support grid positioned against the sifting screen, biased by the shaker springs away from the bottom of the container, and configured to move with the sifting screen along the retaining pin. The support grid further comprises one or more pegs limiting movement of the support grid and the sifting spring toward the bottom of the container. Each shaker spring may be positioned around a respective peg.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

DETAILED DESCRIPTION

Embodiments of the invention include a screening bucket for wood cooking pellets with a spring-loaded sifting screen to facilitate the separation of wood dust from the cooking pellets stored in the bucket. The user pours a supply of wood pellets into the bucket, and the dispenses the pellets from the screening bucket into the grill or stove as needed. The wood pellets are dispensed through a pellet port in the lid of the bucket, while the dust is discharged through a dust port in the bottom of the bucket. A spring-loaded sifting screen captured on a retainer pin near the bottom pf the bucket allows to use to shake and tap the bucket to facilitate separation of the dust from the pellets.

Figure 1:
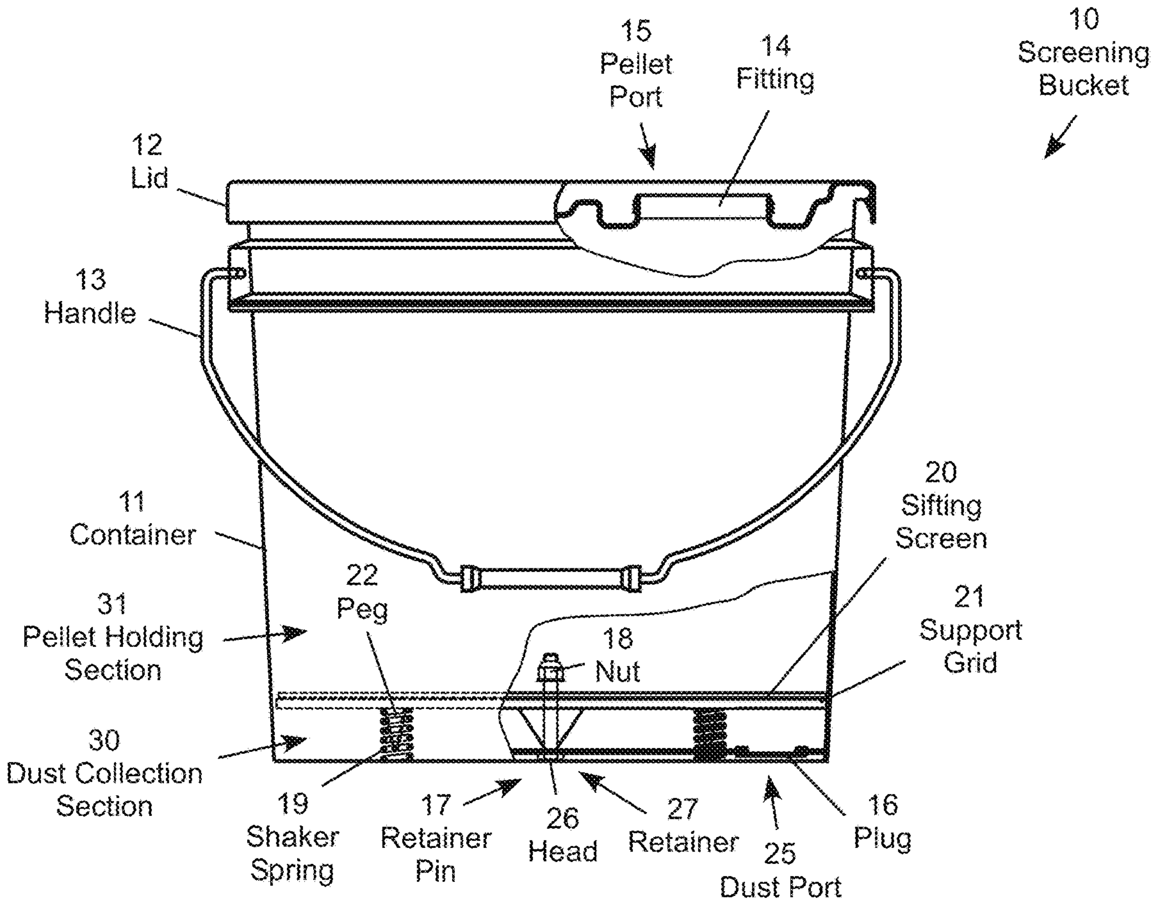
FIG. 1 is a side view of a screening bucket for wood cooking pellets.
Figure 2:
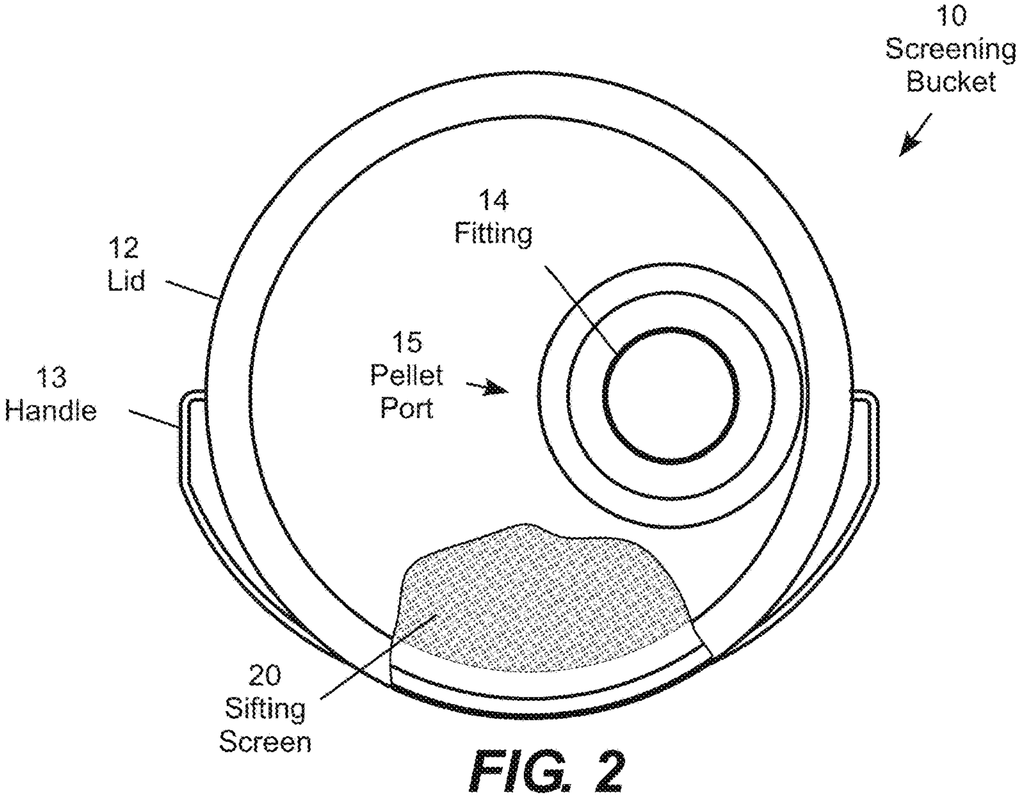
FIG. 2 is a top view of the screening bucket.
Figure 3:
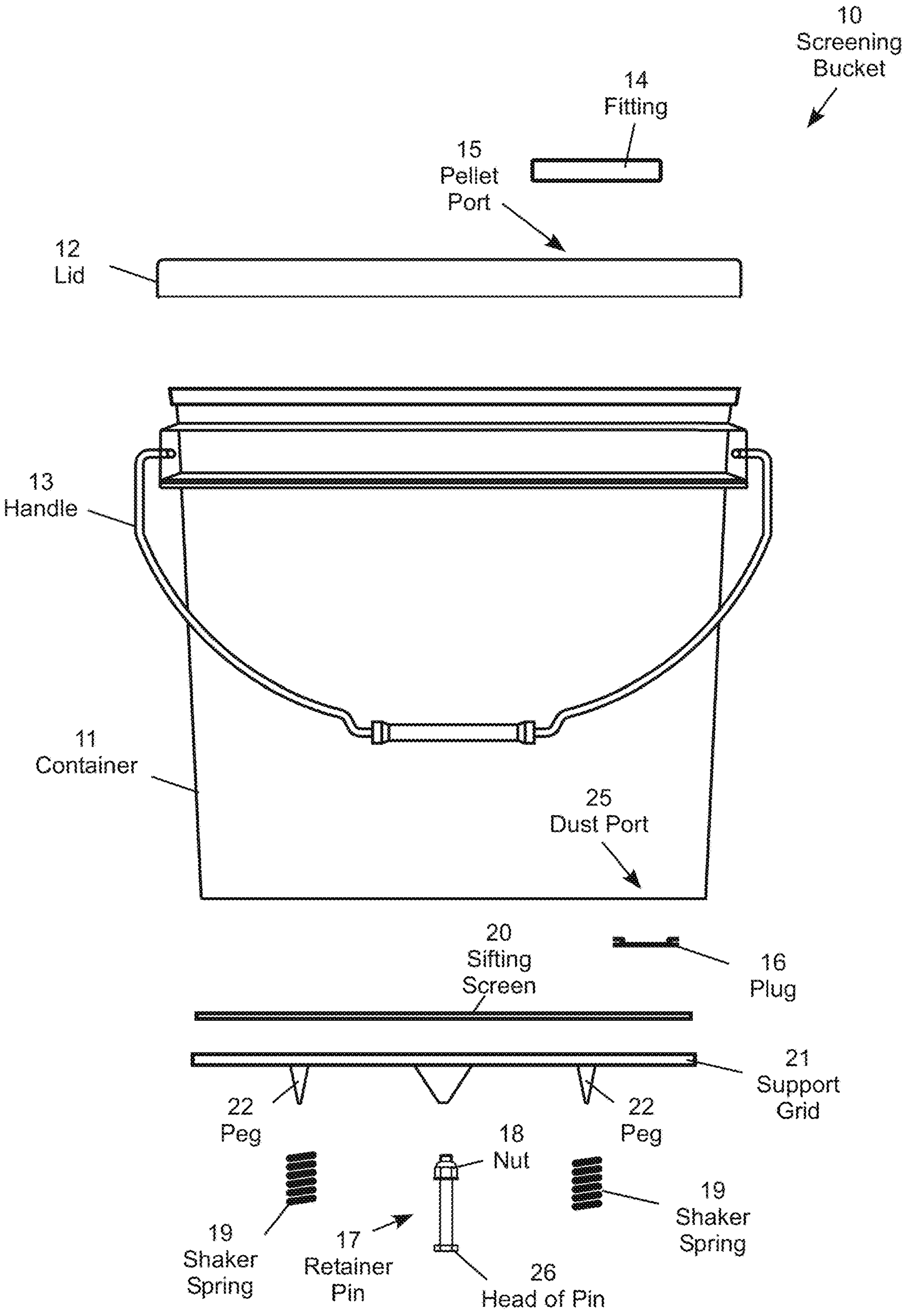
FIG. 3 is an exploded side view of the screening bucket.

FIG. 1 is a side view, FIG. 2 is a top view, and FIG. 3 is an exploded side view of an example embodiment. The screening bucket 10 includes a container 11 and a removable lid 12, which the user removes to pour wood pellets into container. The screening bucket 10 also includes a handle 13 and a fitting 14 for selectively closing a pellet port 15, such as a threaded fitting that can be screwed into or out of engagement with the pellet port. The pellet port 15 is sized to allow the user to dispense the wood pellets out of the top of the bucket in a controller manner. Similarly, a plug 16 selectively closed the a dust port 25 through the bottom of the container. In this example, the plug 16 has an interference fit with a dust port 25 in the bottom of the bucket allowing the user inserted the plug into or out of engagement with the dust port 25. The dust port 25 is sized to allow the user to expel the wood dust out the bottom of the bucket in a controller manner. The threaded fitting 14 and interference-fit plug 16 are representative examples of mechanisms to gate the pellet port 16 and the dust port 25. Other types of gates may be used as a matter of design choice, such as a wedge, cork, pivoting gate, sliding gate, and so forth.

The screening bucket 10 also includes a retainer pin 17 and nut 18 that capture a shaker spring 19, a sifting screen 20, and an optional support grid 21 with one or more peg 22 near the bottom of the bucket. A clip, cotter pin, or other suitable stop may be used on lieu of the illustrative nut 18. This particular example includes multiple pegs and shaker springs represented by the enumerated shaker springs 19 and peg 22. The shaker spring 19 is a compression spring that fits around the peg 22, which is somewhat shorter than the shaker spring. The sifting screen 20 sits on top of the support grid 21 with the shaker spring 19 biasing the sifting screen and the support grid toward the nut 18. The head 26 of the retainer pin 17 is captured by a retainer 27, while the nut 18 remains spaced apart from the bottom of the container. For example, the retainer 27 may be hole through the bottom of the container sized to catch the head 26 of the retainer pin 17 or another suitable type of retainer configured to secure the head of the pin to the bottom of the container 11. The retainer 27 secures the head 26 of the retainer pin 17 to the bottom of the container 11, while allowing the sifting screen 20 to move along the retainer pin 17. In embodiments with an optional support grid 21, the support grid moves with the sifting screen along the retainer pin 17. The nut 18 captures the sifting screen 20 and the optional support grid 21 spaced apart from the bottom of the container 11, forming a dust collection section 30 between the sifting screen and the bottom of the container. The sifting screen 20 divides the interior of the container 11 into the dust collection section 30 above the sifting screen and a pellet holding section 31 above the sifting screen. The sifting 20 screen has a mesh size causing the wood pellets 40 to remain in the pellet holding section 31, while allowing wood dust 41 shed by the wood pellets to pass through the sifting screen into the dust collection section 30 where it can be can be conveniently discharged out of the container through the dust port 25. For example, a mesh size in the range of ⅛-inch to ¼-inch has been found suitable for separating the wood dust 41 from the wood pellets 40 without excessive clogging.

The sifting screen 20 and the support grid 21 have holes allowing them to receive and reciprocate on the retainer pin 17 while remaining captured by the nut 18. There is a small difference in height between the shaker spring 19 (taller) and the peg 22 (shorter) allowing the sifting screen 20 and support grid 21 to reciprocate on the retainer pin 17 within a top portion of the dust collection section 30 to facilitate sifting the dust into the dust collection section. This allows the user to lift the bucket 10 by the handle 13 and tap the bottom of the container 11 against a hard surface to facilitate separation of the dust from the wood pellets. As the user taps and jostles the container, the sifting screen 20 and support grid 21 reciprocate on the retainer pin 17 against the bias of the sifting spring 19, within the limit provided by difference in height between the sifting spring 19 and the peg 22, to jostle the sifting screen causing the dust to settle past the wood pellets, through the sifting screen 20, and into the dust collection section 30.

Figure 4:
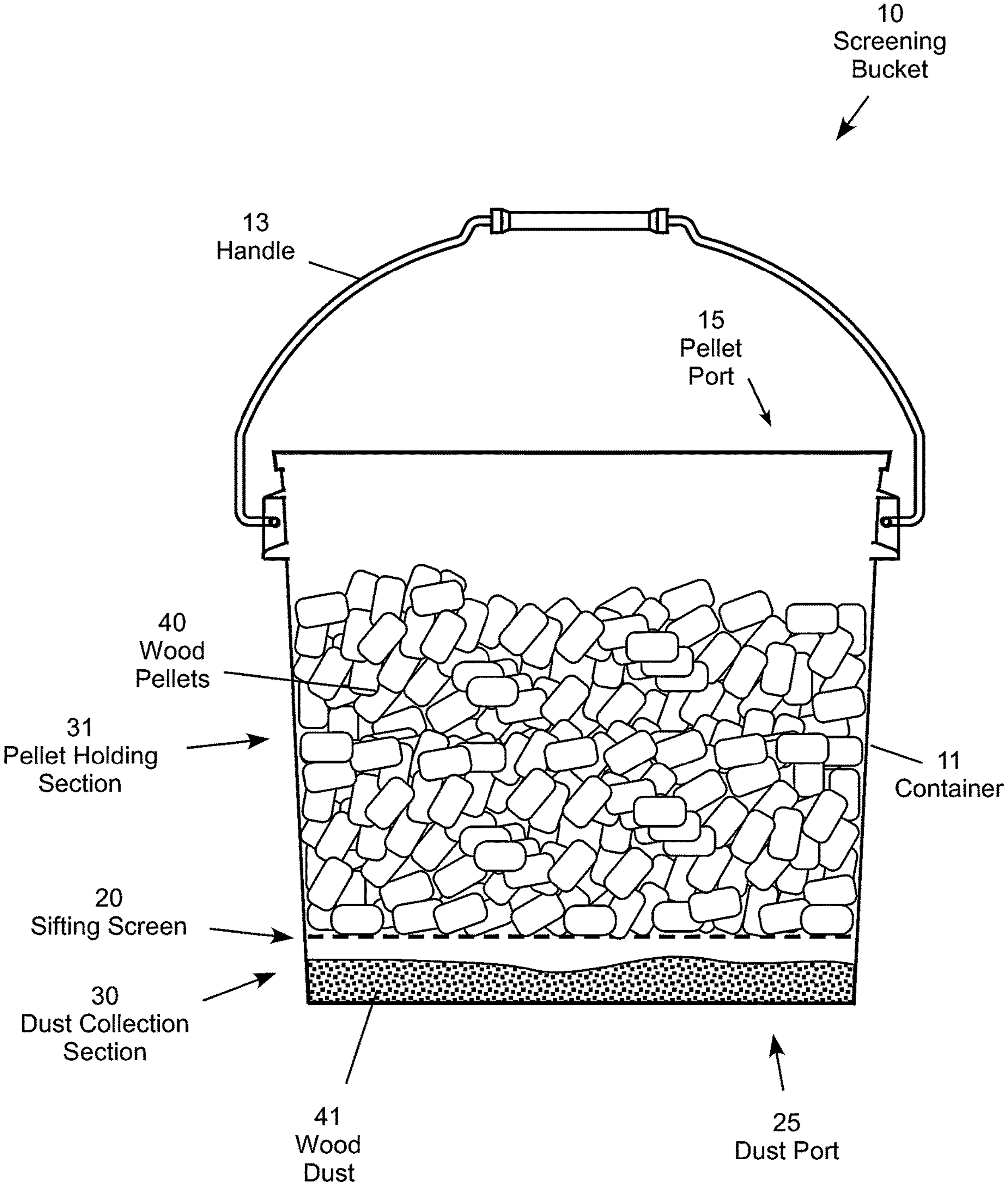
FIG. 4 is a side cross-section view of the screening bucket.

FIG. 4 is a side cross-section view showing wood dust 41 in the dust collection section 30 and wood pellets 40 in the pellet holding section 31 of the container 11. The user typically removes the lid from the container to pour the wood pellets 40 from a bag or other supply into the pellet holding section 31, where they remain above the sifting screen 20. The wood dust 41 eventually settles through the sifting screen 20 into the dust collection section 30, as helped along by the user tapping and the jostling action of the spring-loaded sifting screen 32. The user can remove the lid to refill the pellet holding section 31 of the container 11, as desired.

Figure 5:
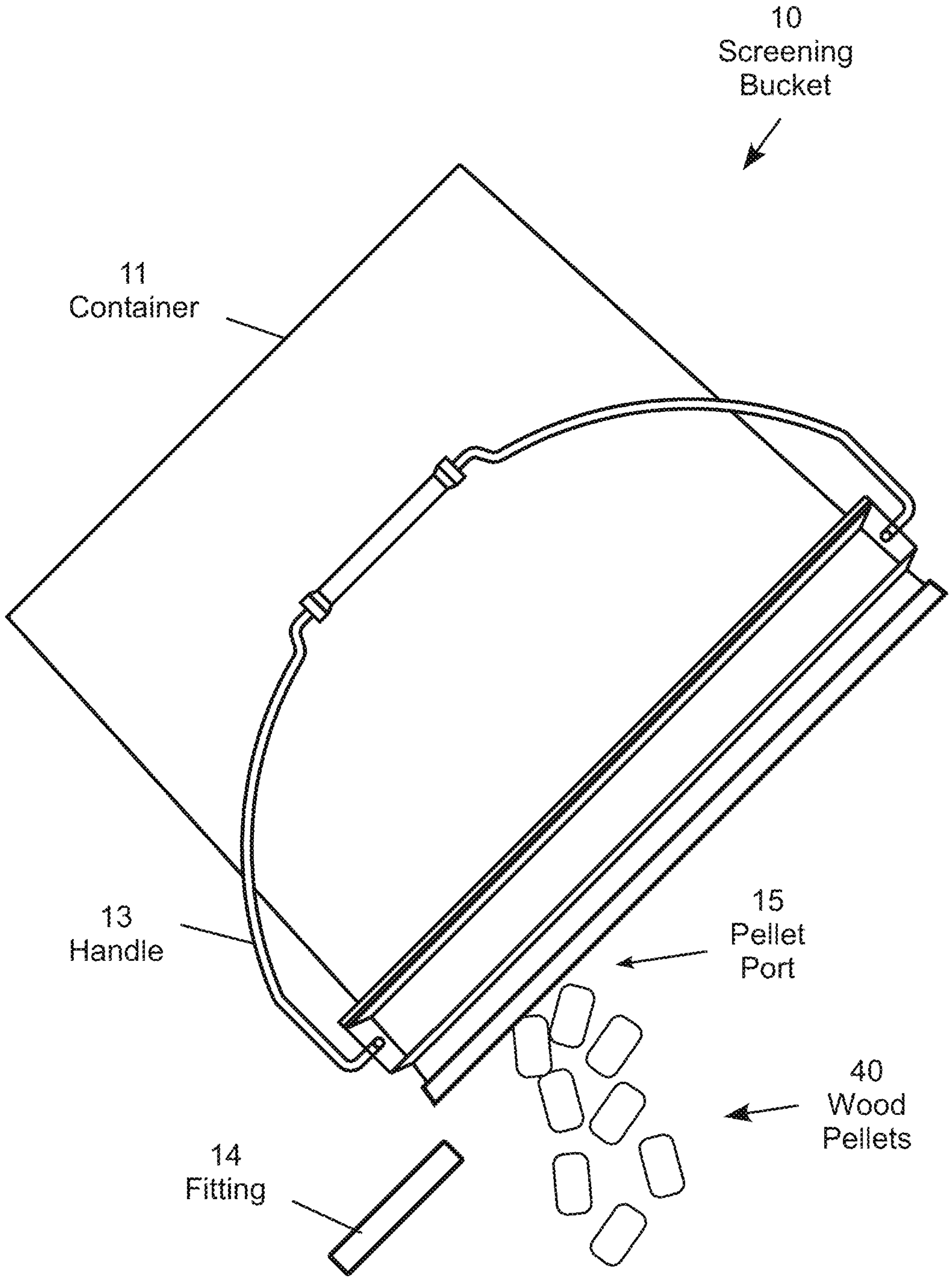
FIG. 5 is a side view of the screening bucket shown tipped over dispensing wood cooking pellets.

As shown in FIG. 5, the user can remove the threaded fitting 14 and pour the wood pellets 40 through the pellet port 15, as desired. The user typically taps the bucket against a hard surface to sift the wood dust into the dust collection section before pouring the pellets out through the pellet port.

Figure 6:
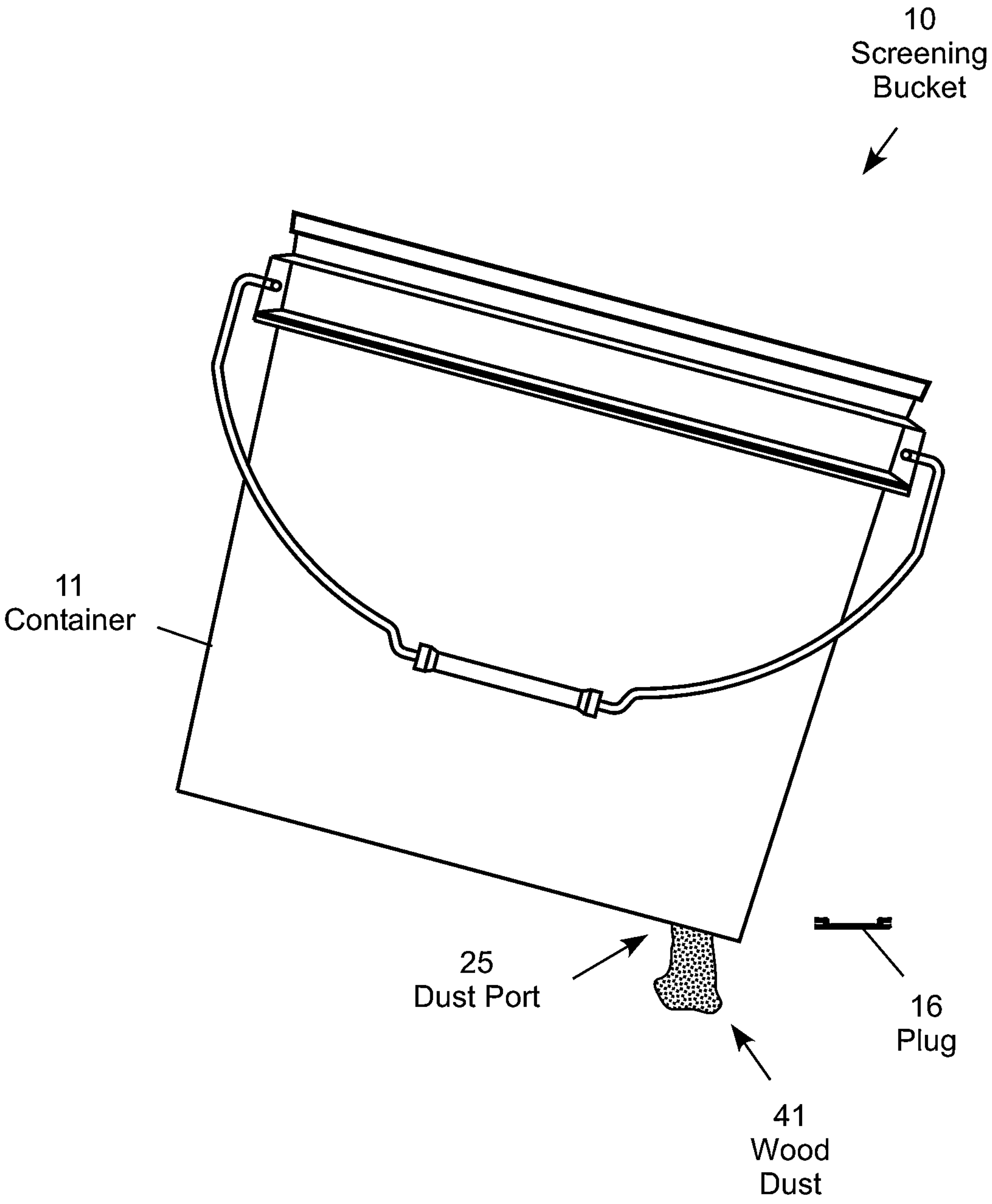
FIG. 6 is a side view of the screening bucket shown tilted discharging wood dust.

As shown in FIG. 6, the user can remove the plug 16 and dump the wood dust 41 through the dust port 25, as desired. Again, the user typically taps the bucket against a hard surface to sift the wood dust into the dust collection section before removing the plug and dumping the wood dust out through the dust port. The most fastidious user may choose to evacuate the dust through the dust port in the bottom of the bucket before pouring the pellets out the pellet port in the top to minimize the chance of dust coming out with the pellets.

The container 11, lid 12 and fitting 14 may be fabricated from heavy-duty food-grade plastic, such as high-density polyethylene (HDPE), and the handle 13 is may be fabricated from steel with a plastic grip. This portion of the screening may be a conventional food grade 3-gallon or 5-gallon bucket. The support grid may be fabricated from plastic, such as HDPE, steel wire or another suitable material. The sifting screen may be fabricated from a stainless steel, plastic or another suitable material. The plug 16 may be fabricated from rubber, silicon, or another flexible material sufficiently sturdy to remain in the dust port 25 until manually removed.

Although particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A screening bucket for wood cooking pellets, comprising:

a container defining a top, a bottom, and an interior;

a lid removably attached to the top of the container comprising a pellet port sized for dispensing wood pellets from the interior of the container through the lid;

a sifting screen spaced apart from the bottom of the container dividing the interior of the container into a pellet holding section and a dust collection section;

a retainer pin capturing the sifting screen to the bottom of the container while allowing the sifting screen to move along the retainer pin of the retainer;

one or more shaker springs positioned between the sifting screen and the bottom of the container biasing the sifting screen away from the bottom of the container;

a dust port through the bottom of the container for discharging wood dust shed by wood pellets;

wherein the sifting screen has a mesh size causing wood pellets in the pellet holding section to remain above the sifting screen while allowing wood dust shed by the wood pellets to pass through the sifting screen into the dust collection section;

wherein movement of the sifting screen along the retainer in response to jostling and tapping of the container facilitates movement of the wood dust from the pellet holding section into the dust collection section.

2. The screening bucket of claim 1, further comprising a handle retained by the container for lifting while tapping, jostling, tilting and tipping over the container.

3. The screening bucket of claim 1, further comprising a removable fitting sized to selectively fit in the pellet port.

4. The screening bucket of claim 1, further comprising a removable plug sized to selectively fit in the dust port.

5. The screening bucket of claim 1, wherein the mesh size is in the range of ⅛-inch to ¼-inch.

6. The screening bucket of claim 1, wherein the retainer securing a head of the retainer pin to the bottom of the container.

7. The screening bucket of claim 1, further comprising a nut capturing the sifting screen on the retainer pin while allowing the sifting screen to move along the retainer pin away from the nut toward the bottom of the container.

8. The screening bucket of claim 1, further comprising a support grid positioned against the sifting screen, biased by the shaker springs away from the bottom of the container, and configured to move with the sifting screen along the retaining pin.

9. The screening bucket of claim 8, wherein the support grid further comprises one or more pegs limiting movement of the support grid and the sifting spring toward the bottom of the container.

10. The screening bucket of claim 9, wherein each shaker spring is positioned around a respective peg.

11. A screening bucket for wood cooking pellets, comprising:

a container defining a top, a bottom, and an interior;

a lid removably attached to the top of the container comprising a pellet port sized for dispensing wood pellets from the interior of the container through the lid;

a sifting screen spaced apart from the bottom of the container dividing the interior of the container into a pellet holding section and a dust collection section;

a retainer pin capturing the sifting screen to the bottom of the container while allowing the sifting screen to move along the retainer pin of the retainer;

one or more shaker springs positioned between the sifting screen and the bottom of the container biasing the sifting screen away from the bottom of the container;

a dust port through the bottom of the container for discharging wood dust shed by wood pellets;

a handle retained by the container for lifting while tapping, jostling, tilting and tipping over the container;

a removable fitting sized to selectively fit in the pellet port;

a removable plug sized to selectively fit in the dust port;

a retainer securing a head of the retainer pin to the bottom of the container;

wherein the sifting screen has a mesh size causing wood pellets in the pellet holding section to remain above the sifting screen while allowing wood dust shed by the wood pellets to pass through the sifting screen into the dust collection section;

wherein movement of the sifting screen along the retainer in response to jostling and tapping of the container facilitates movement of the wood dust from the pellet holding section into the dust collection section.

12. The screening bucket of claim 11, wherein the retainer securing a head of the retainer pin to the bottom of the container.

13. The screening bucket of claim 11, further comprising a nut capturing the sifting screen on the retainer pin while allowing the sifting screen to move along the retainer pin away from the nut toward the bottom of the container.

14. The screening bucket of claim 11, further comprising a support grid positioned against the sifting screen, biased by the shaker springs away from the bottom of the container, and configured to move with the sifting screen along the retaining pin.

15. The screening bucket of claim 14, wherein the support grid further comprises one or more pegs limiting movement of the support grid and the sifting spring toward the bottom of the container and each shaker spring is positioned around a respective peg.

16. A screening bucket for wood cooking pellets, comprising:

a container defining a top, a bottom, and an interior;

a lid removably attached to the top of the container comprising a pellet port sized for dispensing wood pellets from the interior of the container through the lid;

a sifting screen spaced apart from the bottom of the container dividing the interior of the container into a pellet holding section and a dust collection section;

a retainer pin capturing the sifting screen to the bottom of the container while allowing the sifting screen to move along the retainer pin of the retainer;

one or more shaker springs positioned between the sifting screen and the bottom of the container biasing the sifting screen away from the bottom of the container;

a dust port through the bottom of the container for discharging wood dust shed by wood pellets;

wherein the sifting screen has a mesh size causing wood pellets in the pellet holding section to remain above the sifting screen while allowing wood dust shed by the wood pellets to pass through the sifting screen into the dust collection section;

wherein movement of the sifting screen along the retainer in response to jostling and tapping of the container facilitates movement of the wood dust from the pellet holding section into the dust collection section;

further comprising a support grid positioned against the sifting screen, biased by the shaker springs away from the bottom of the container, and configured to move with the sifting screen along the retaining pin.

17. The screening bucket of claim 16, wherein the support grid further comprises one or more pegs limiting movement of the support grid and the sifting spring toward the bottom of the container and each shaker spring is positioned around a respective peg.

18. The screening bucket of claim 17, further comprising a handle retained by the container for lifting while tapping, jostling, tilting and tipping over the container.

19. The screening bucket of claim 18, further comprising:

a removable fitting sized to selectively fit in the pellet port;

a removable plug sized to selectively fit in the dust port.

* * * * *